March 12, 1963 W. J. BISSINGER Re. 25,348
WEIGHT-COMPENSATING MEANS FOR PRECISION-SHIFTED MEMBERS
Original Filed May 2, 1955 2 Sheets-Sheet 1
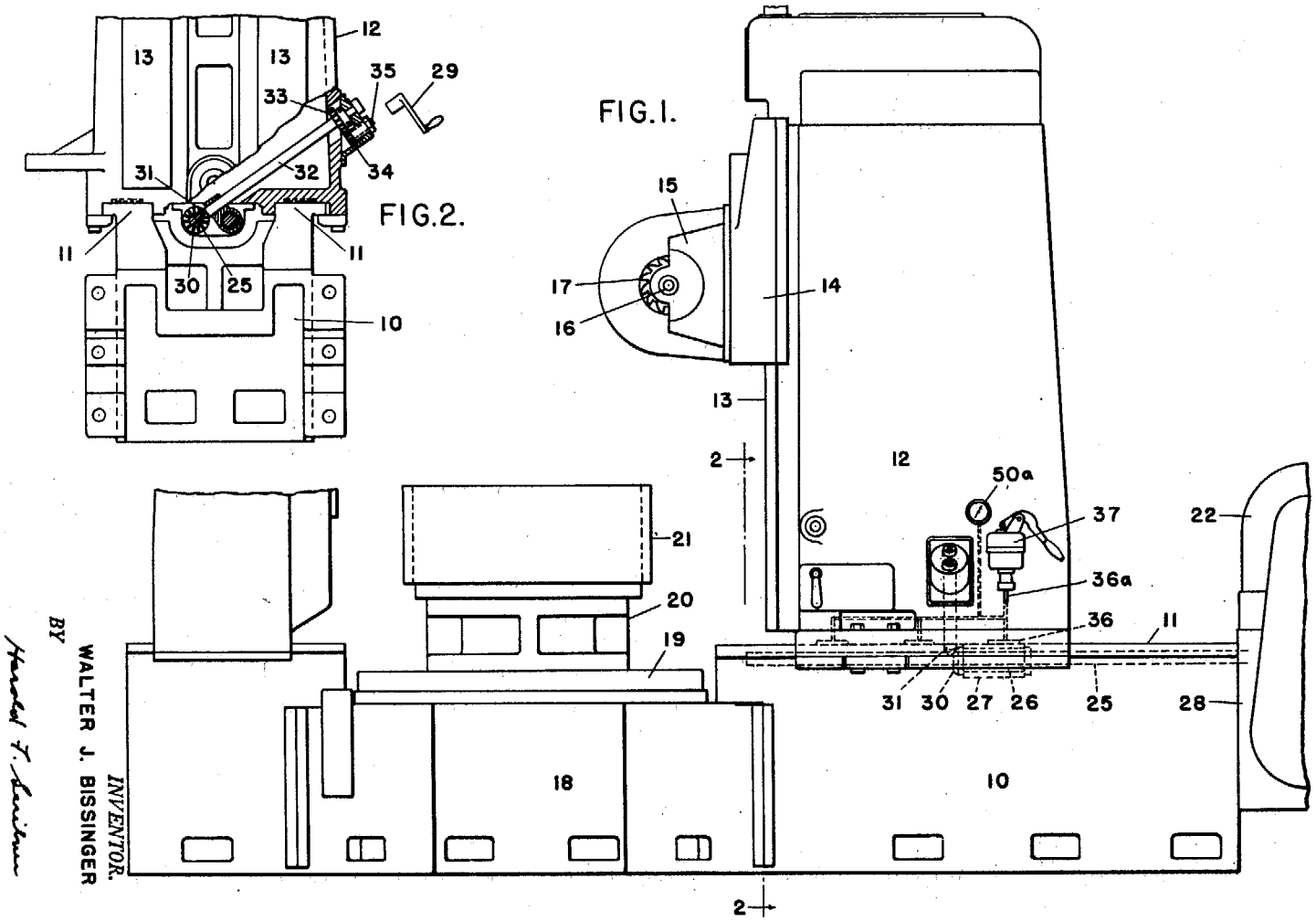
INVENTOR.
WALTER J. BISSINGER
BY
Harold T. Sullivan
ATTORNEY March 12, 1963 W. J. BISSINGER Re. 25,348
WEIGHT-COMPENSATING MEANS FOR PRECISION-SHIFTED MEMBERS
Original Filed May 2, 1955 2 Sheets-Sheet 2
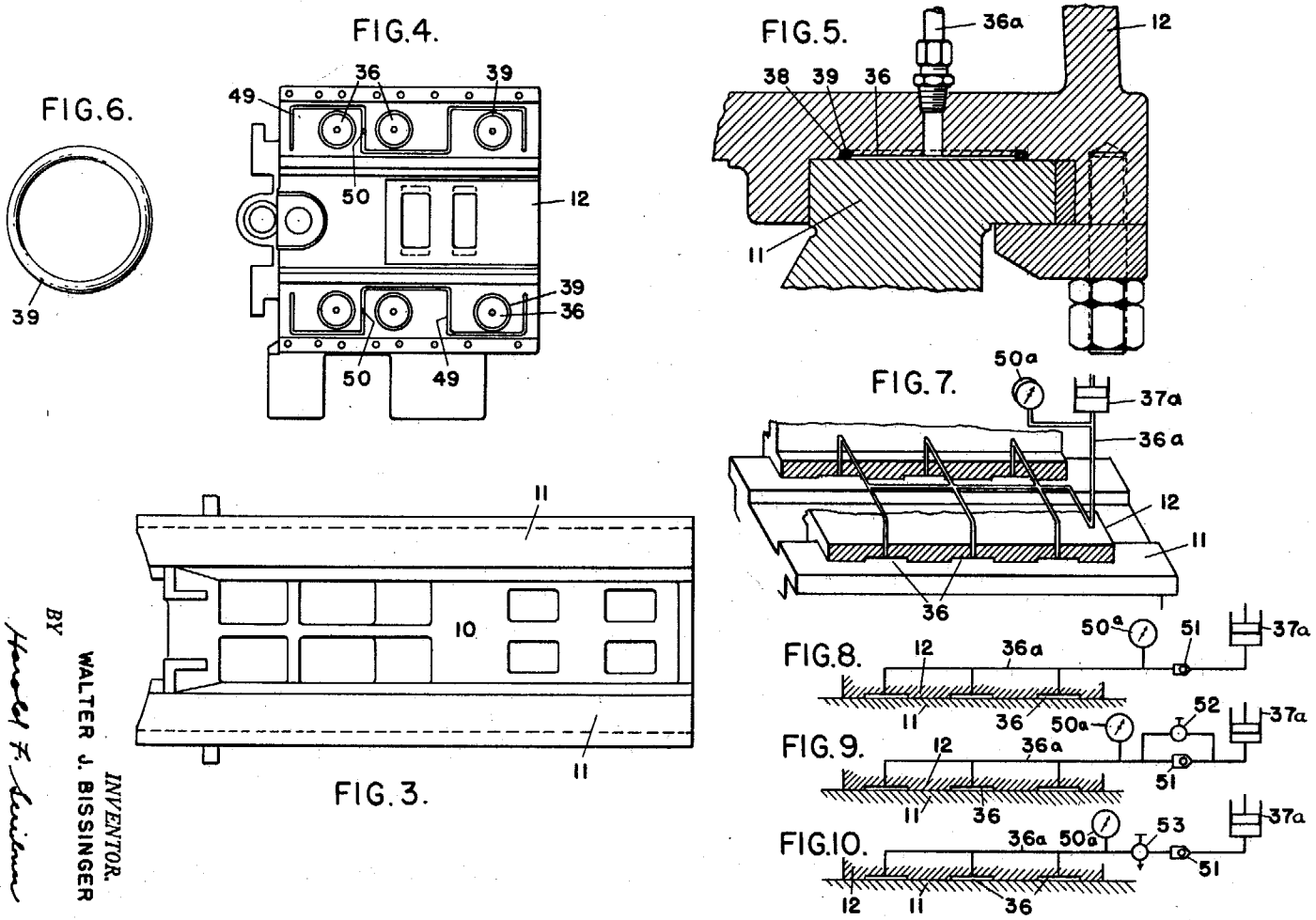
INVENTOR.
WALTER J. BISSINGER
BY
Harold F. Seidman
ATTORNEY United States Patent Office Re. 25,348
Reissued Mar. 12, 1963

25,348
WEIGHT-COMPENSATING MEANS FOR PRECISION-SHIFTED MEMBERS

Walter J. Bissinger, Parsippany, N.J., assignor, by mesne assignments, to Norton Company, Worcester, Mass., a corporation of Massachusetts Original No. 2,869,933 dated Jan. 20, 1959, Ser. No. 505,323, May 2, 1955. Application for reissue Jan. 18, 1961, Ser. No. 105,834
12 Claims. (Cl. 308—5)

Matter enclosed in heavy brackets [ ] appears in the original patent but forms no part of this reissue specification; matter printed in italics indicates the additions made by reissue.

This invention concerns a stick-slip problem encountered in attempting to obtain fine adjustments in position of a relatively heavy mass and in attempting to move the heavy mass at a controlled slow rate on or along its supporting surface, a primary aim of the invention being to overcome the tendency of a heavy mass to stick to its support on application of a moving force and to provide improved means that enables one to exercise exceedingly sensitive control over the position of the mass relative to the support or in its rate of movement along the support, to the end of facilitating setting-up operations and the operational functions of the machine, mechanism or device.

Prior to this invention attempts have been made to obtain accuracy in the positioning of a heavy member by means of lubricating systems, special oils, and mechanically by jarring or vibrating the member as it is moved manually or by power to the desired location. Such prior devices have proved unsatisfactory chiefly because of the requirement for elaborate equipment and because they were unduly extravagant in the use of the special lubricants required. The present invention aims to provide a simple means that may be operated economically to afford substantially frictionless support for a heavy member and which when in operation effectively compensates for a substantial portion of the weight of the member so that that portion of the weight of the member that remains in metal-to-metal contact on the finished ways of the support is well within the compression and tension factors of the shifting transmission so as to enable an operator to inch the heavy member along the ways and obtain high accuracy in its final position.

A further aim of the invention is to provide a simple and effective weight-compensating means that may be conveniently installed and operated either continuously as in the case of feeding a heavy member at a predetermined slow rate, or intermittently as in the case of setting a member in a precise position for a given operation or series of operations, and when installed and operated neither vibrates or jars the member nor effects a lifting thereof during the shifting operation.

For the purposes of explaining the invention more fully reference will be made to a hobbing machine which customarily is provided with a bed member having machined ways along its top and upon which rests a massive shiftable column or stanchion that may weigh many tons. The invention may of course be applied to other types of mechanisms as will be understood. However, in the hobbing machine selected for this description the stanchion ways are usually wide flat surfaces affording hundreds of square inches of surface area that are in metal-to-metal bearing contact with an equal area of the ways on the bed of the machine. With a stanchion and its auxiliaries, such as the hobbing spindle and its drive weighing many tons, there is not only tremendous static friction between the bearing surfaces but also an enormous frictional load on the surfaces during movement of that part. And notwithstanding the developement of special bearing lubricants and the tendency to make the feed screws and nuts or piston-and-cylinder shifting components larger and more massive it is exceedingly difficult to obtain precision adjustments without having the stanchion jump forward .001 of an inch or so or to lag behind a similar amount from the intended or desired setting. In gear-hobbing machines particularly a setting of the hob for depth of tooth with a tolerance of plus or minus .001 would be intolerable. The present invention undertakes to provide a means for reducing the static coefficient of friction between the bearing surfaces so that conventional transmissions, power-driven or manual, may be employed to ease the heavy member along its ways or into the precise location or position desired with an extremely high degree of accuracy.

In attaining the objectives of the invention it is proposed to provide a series of shallow cavities in the bearing surfaces of one of the members and to fill such cavities with a fluid medium, preferably oil, under pressure. Conveniently, the oil under pressure may be derived from a suitable system already existing in the machine or derived from an independent source having means, either power or manually operated, to build up the desired pressure. Assuming, for example, that a given cavity or pressure pocket in a bearing surface is on the order of 5½ inches in diameter and oil at a pressure of 60 p.s.i. is injected into the cavity there is the equivalent of 1500 pounds' pressure force exerted upwardly in counteraction to a force of equal magnitude exerted downwardly by the member. Thus it will be seen that the downwardly acting force of 1500 pounds will be resting on oil instead of the metal surfaces of the machine's bearing surfaces and the total static friction on the bearing surfaces is reduced by a corresponding amount. In the hobbing machine herein depicted six such oil pockets have been provided in the bearing surfaces of the stanchion and if each is maintained under 60 p.s.i. pressure and each supports 1500 pounds of the weight of the stanchion, approximately 4½ tons of the total weight of the stanchion is supported on oil and the remainder on metal. And since the oil offers little or no resistance to sliding it becomes relatively easy to move the effectively lightened mass and obtain precision settings of the cutter or tool with relation to the work with comparatively little difficulty.

The provision of oil pockets alone, however, does not provide a commercially satisfactory or effective solution to the problem, firstly, because of the relatively rapid drop in pressure that results due to seepage, and secondly because the oil used and which is lost due to seepage cannot by recovered economically. The invention therefore proposes a construction in which the weight-compensating pressure chambers are formed with marginal grooves designed to receive and effectively anchor a resilient sealing gasket preferably to the O-ring type. The outer walls of each recess and groove are so formed as to completely surround the O-ring seal and as the side walls are in bearing engagement with the ways of the main frame or bed there is no likelihoood of the seal blowing out when pressure is applied to the cavity circumscribed by the O-ring. In this application, the O-ring is partially imbedded and functions as the walls of a cylinder and whose ends are pressed tightly against the bottom of the groove and against the bearing surface of the support and at the same time completely surrounds a shallow chamber adapted to receive a fluid medium such as oil, filtered air, etc., under pressure. A construction of this kind and for this purpose has been found to provide a tight seal about the margins of the pressure cavity that will permit shifting of one member upon another and will hold the pressure for indefinite periods without noticeable loss.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

FIG. 1 of the drawings represents a gear-hobbing machine embodying weight-compensating means for the movable stanchion constructed in accordance with this invention.

FIG. 2 is an elevation, partly in section, taken substantially along line 2—2 of FIG. 1.

FIG. 3 is a plan view of the stanchion bed.

FIG. 4 is an underside view of the stanchion illustrating an arrangement of weight-compensating pressure cavities and an independent system of way-lubricating grooves.

FIG. 5 is an enlarged sectional view of one of the pressure cavities.

FIG. 6 is a detail view of an O-ring pressure-pocket seal.

FIG. 7 is a diagrammatic perspective view illustrating a series of pressure pockets connected to a common source of pressure.

FIGS. 8, 9, and 10 are diagrammatic views illustrating alternative forms of pressure systems that may be employed.

Referring more particularly to FIG. 1 of the drawings, the hobbing machine illustrated includes a base section 10 which has a pair of parallel stanchion-supporting guideways 11 along the top thereof. Each guideway is constructed with a relatively wide upper bearing surface upon which rests a shiftable stanchion 12. The stanchion 12 is provided with vertical guides 13 which support and guide a movable cutter slide 14. The cutter slide in turn carries a swivel head 15 in which is journaled a rotary hob spindle 16 that carries a hob 17. The machine base 10 is provided with a forward extension 18 in which a rotary work table 19 is journaled. The table 19 may be provided with a work fixture 20 that mounts a workpiece 21. The hob spindle and the work spindle as well as the hob-feed movement are driven in timed relation through conventional gear trains receiving power from a main motor 22. These transmissions form no part of the present invention and need not be described in further detail. If desired, however, one may obtain further particulars thereof by referring to the patents to Zimmermann Nos. 2,183,363, 2,195,911, 2,211,309, 2,330,167 and 2,330,168.

In setting-up a machine of this character the work blank is mounted on the worktable and the massive stanchion 12 advanced along the ways 11 until the hob is correctly positioned with relation to the pitch of the gear to be machined. To move the stanchion a substantial feed screw 25 is provided that operates in a nut 26 secured to the stanchion 12. In this instance the nut 26 is journaled for rotation in a supporting bracket 27 and if locked against rotation and the screw 25 rotated the stanchion may be shifted, and if the nut is revolved and the screw locked against rotation, the stanchion may be shifted. For infeeding operations or for shifting the stanchion major distances along the ways 11, power means enclosed in a gear housing 28 may be utilized to rotate the screw shaft 25. For minor adjustments in position, manual means in the form of a detachable hand crank 29 is provided to rotate the nut 26 and to effect precision adjustment of the stanchion.

As shown more clearly in FIGS. 1 and 2, the stanchion nut 26 is formed with a bevel gear 30 at one end that meshes with a smaller bevel gear 31 on the lower end of a shaft 32. Shaft 32 extends diagonally through the stanchion toward the operator's side of the machine and carries near its outer end a spur gear 33 that is meshed with a pinion gear 34 on a stub shaft 35. The stub shaft 35 is squared or keyed at its outer end to receive the crank handle 29. The speed reduction provided by gears 33 and 34 and by bevel gears 30 and 31 in addition to power amplification afforded by the threads of the screw and nut 25, 26, is calculated to enable an operator not only to shift the massive stanchion manually but to obtain exceedingly fine adjustments in the positioning thereof.

As above indicated, however, the movement of a heavy mass along finished guideways presents what is known as a stick-slip problem or the tendency of a heavy mass to resist movement momentarily and then suddenly to jump ahead. It is difficult therefor for an operator to obtain a precision setting such as required, for example, in setting a hob with respect to a gear blank. It will be seen further that heavy masses are essential in many cases to give body and firmness to the supporting parts during, for example, the tooling operations and it is not feasible therefore to reduce the weight of the casting or the sizes of the parts in order to reduce the static friction on the ways to a value that will eliminate stick-slip conditions, nor is it practical to vibrate or jar the heavy mass in effecting movement thereof to a predetermined accurately located position.

The present invention proposes a simple solution for overcoming the aforesaid problem which consists essentially in temporarily relieving or removing a substantial portion of the weight of a heavy member from the part on which it rests by causing a portion of the weight to be borne by a frictionless agent during the period or periods that the mass is to be moved or inched along the ways. A preferred agent for this purpose is oil or other fluid medium that may be confined in a chamber and placed under pressure. In accordance with this invention the pressure chambers are formed, preferably, as open-ended recesses in one of the relatively movable members, each recess opening toward the bearing surface of the other member and closed by said bearing surface. As illustrated more clearly in FIGS. 3 thru 6, a series of shallow but large-in-area cavities 36 are formed in the bearing surfaces of the stanchion member. Such cavities may be circular, oval, or rectangular according to the nature and configuration of the part to be shifted and located at the regions of heaviest load concentration. The generally plane surface of the complementary bearing surface 11 effectively closes the open recesses and forms substantially closed pressure chambers of relatively large surface area. When such chambers are connected as by lines 36a to a source of pressure 37 and a pressure in the order of 60 p.s.i. applied, each pressure chamber will be subjected to that unit pressure and will exert an upwardly acting force on the stanchion in direct proportion to its surface area. Accordingly an equivalent portion of the weight of the stanchion is removed from the metal-on-metal relation with the bed ways and transferred to a metal-on-fluid relation with the bed. This latter relation being practically frictionless, a proportionate portion of the static friction of the mass is removed from the [bearings] *bearing* surfaces and only the remaining portion of the weight need be overcome by the manual- or power-shifting means. Consequently the effort required to shift a heavy mass is reduced to reasonable proportions enabling movement to be accomplished with ease and precision.

Inasmuch as the pressure chambers herein disclosed are closed by a relatively movable surface, out leakage from the chambers is inevitable and to prevent such seepage and loss of pressure the invention proposes to provide an annular resilient seal about the margins of each recess. To that end each recess is formed with an annular groove 38 into which is placed a resilient ring of rubber, neoprene, or like impervious composition. The grooves are less in depth than the cross-sectional thickness of the ring so that the ring is caused to press tightly against the bed ways and the bottom of the marginal grooves and thus provide an effective fluid-tight seal about the margins of the recesses. The seals do not in themselves offer any resistance to movement for not only are they adequately lubricated from within but receive lubrication from the exterior by virtue of the film of lubricant applied between the bearing surfaces by conventional lubricating systems such as herein illustrated by oil grooves 49. Oil grooves 49 receive lubricating oil through connections 50 from a source preferably independent from the source of weight-compensating fluid supplied to the chambers 36.

FIG. 1 at 37 illustrates a commercially available Bijur hand pump that may be connected into the weight-compensating system and operated by hand to build up the desired weight-compensating pressure in the various oil pockets. Preferably a pressure gauge 50a is incorporated in the system so that the value of the pressure developed and also the pressure value existing at any time during a shifting operation may be ascertained. In FIGS. 8, 9, and 10, the pressure-producing means is indicated diagrammatically at 37a as a simple piston and cylinder but it will be understood that this is only representative of any suitable source of pressure, either manual or power, and either self-contained in the machine or derived from an external source. In these diagrammatic figures, flow-control means are illustrated represented as a nonreturn valve 51 in the system between the pressure source 37a and the pressure chambers 36 to hold the pressure as in FIG. 8, or the system may be equipped with a return bypass valve 52 operable at will to relieve the pressure as in FIG. 9, or with a relief valve 53 that manually or automatically relieves to atmosphere as in FIG. 10. A given adaptation or installation of the O-ringed-sealed weight-compensating pressure pockets for solving stick-slip problems without jarring or lifting a heavy mass, will determine the type of fluid system to be employed.

While the foregoing detailed description concerns primarily the overcoming of static friction or the friction of rest, the invention is also useful in overcoming a substantial portion of the friction created by a heavy part in motion and is applicable to situations involving operational functions of a heavy mass and to situations wherein a controlled steady movement of the mass may be required. By again using the hobbing machine disclosed herein as an example, there are occasions wherein a wormgear is to be hobbed using the infeed method of moving the cutter. In such a case the hob is set opposite the blank and the stanchion and hob slowly fed radially inwardly until the full-depth of tooth is reached. During the slow infeed the stanchion may move as little as .005" per revolution of the blank, and in some cases as little as .005" or .006" in one and one-half hours, which to the eye is imperceptible. However, by counterbalancing a substantial portion of the weight of the stanchion and the parts carried thereby as by means of the sealed pressure pockets herein disclosed it is possible to move the heavy mass slowly at the controlled steady rate desired and obtain the long-wanted uniformity and precision finish on the workpiece.

It will be seen further that while it is preferable in most applications of the invention to construct the rim-sealed oil pockets as large-in-area as practicable to the end of requiring low unit pressures in the pressure system, there may be conditions in machine tools and other fields having heavy-mass moving or adjusting problems wherein it may be more desirable to employ a high-pressure system in which case the area of the weight-relieving pressure pockets may be reduced. Such modifications are envisaged within the governing requirement of the invention that the counteracting pressure be not so high as to lift the member or render it unstable on its support for the performance of its intended function.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a machine tool, a supporting frame member having horizontally disposed relatively flat bearing surfaces, a relatively massive tool carrier having complementary flat surfaces movable along said bearing surfaces of the frame member, the weight of said carrier normally developing a relatively high coefficient of static friction between the said bearing surfaces inducing a stick-slip condition when the carrier is to be adjusted to a preselected precision located point along said frame member bearing surfaces, means to supply lubricant to said bearing surfaces, and separate means isolated from said lubricating means operative to relieve said bearing surfaces of a portion of the static frictional load of the carrier comprising a shallow but relatively large-in-area recess formed in the bearing surfaces of said carrier and opening toward the bearing surface of said frame member, means independent of the said lubicating means for supplying said recess with a fluid medium under pressure so that a portion of the weight of the tool carrier is borne by the fluid medium and a portion by the remaining bearing surfaces thereof whereby to effect a decrease in the static frictional load on the bearing surfaces of the frame member, means for sealing the joint formed at the margins of said recess and the bearing surfaces of the frame and carrier members to exclude the lubricant supplied to the bearing surfaces and to prevent seepage of the pressure medium from the recess, said sealing means being constructed as to permit lateral movement of the one member along the bearing surface of the other, and means for adjusting the carrier along the bearing surfaces of said frame member while the latter are so relieved of a portion of the static frictional load thereon.

2. The combination of claim 1 in which the joint between the margins of said recess and the bearing surface of said frame member is sealed by a resilient O-ring.

3. In a machine tool, a frame member having a relatively flat load-supporting bearing surface along its upper portion, a supporting structure movable along said frame member, said supporting structure having a relatively flat bearing surface complementary to and in bearing relation with the bearing surface of said frame member, and said supporting structure having a relatively shallow recess formed in its bearing surface in open communication with the bearing surfaces of said frame member, said recess being relatively large in surface area and its open end closed by the flat bearing surface of the frame so as to form a chamber, means including a conduit in said movable supporting structure and connected with the interior of said chamber for supplying said chamber with a fluid medium [under] *maintained at a substantially constant* pressure so that a *predetermined substantial* portion of the weight of said structure is borne *continuously* by the fluid medium and the remainder by said bearing surfaces, [and] means for moving the structure along the said load-supporting bearing surfaces while a *predetermined substantial* portion of the weight is borne by the fluid medium *maintained at a substantially constant pressure* in said chamber, and separate means for supplying lubricant to the bearing surfaces surrounding the load-counteracting pressure chamber.

4. In a machine tool, a frame member having a relatively flat load-supporting bearing surface along its upper portion, a member movable along said frame member, said movable member having a relatively flat bearing surface complementary to and in bearing relation with the bearing surface of said frame member, means maintaining said member in bearing relation with said frame member, said member having a relatively shallow recess formed in its bearing surface and opening toward the bearing surfaces of said frame, said recess being relatively large in surface area and its open end closed by the flat bearing surface of the frame so as to form a chamber, sealing means about the margins of said recess, conduit means connected with the interior of said chamber for supplying said chamber with a fluid medium under pressure whereby to cause a portion of the weight of said movable member to be borne by the fluid medium in said sealed chamber, additional means independent of said chamber and said conduits for fluid medium under pressure for lubricating the load-supporting bearing surfaces of the frame member, and means for moving the member along the said load-supporting bearing surfaces of the frame member while they are so relieved of a portion of the weight of the movable member.

5. In a machine tool, a frame member having relatively flat load-supporting bearing surfaces along its upper portion, a structure adapted to be moved along the bearing surfaces of said frame member, said structure having relatively flat bearing surfaces complementary to and in bearing relation with the bearing surfaces of said frame member, and said movable structure having a plurality of shallow but relatively large-in-area recesses formed in its bearing surfaces in open communication with the bearing surfaces of said frame member, said recesses having their open ends closed by the flat bearing surface of the frame so as to form a plurality of chambes, conduit means connected with the interior of said chambers for supplying said chambers with a fluid medium under pressure so that a portion of the weight of said structure is borne by the fluid medium and the remainder by said bearing surfaces, each of said recesses having a perimetrical groove formed therein, resilient means inserted in each groove and partially encased by the walls thereof and adapted to be pressed into engagement with the bearing surfaces of the frame member to form fluid seals about the margins of said chambers, additional means independent of said chamber and said conduits for fluid medium under pressure for lubricating the load-supporting bearing surfaces of the frame member, and means for moving the structure along the said load-supporting bearing surfaces while a portion of the weight thereof is borne by the fluid medium in said chamber.

6. The combination of claim 5 in which the effective area of said recess with relation to the weight of the shiftable structure is such that the pressure medium contained therein counteracts a substantial portion of the weight of the shiftable structure, said substantial portion being less than the total weight of the structure so that the bearing surfaces of the latter remain in bearing engagement with the bearing surfaces of the frame member.

7. In a machine tool, a supporting frame member having horizontally disposed relatively-flat bearing surfaces along its upper side, a relatively massive tool carrier movable along said bearing surfaces, the weight of said carrier normally developing a relatively high coefficient of static friction between the bearing surfaces thereby inducing a stick-slip condition when the carrier is to be adjusted to a preselected precision located point along said bearing surfaces, means for lubricating said bearing surfaces and additional means operative to relieve said bearing surfaces of a portion of the static frictional load of the carrier during the period of movement thereof comprising an open-ended pressure chamber formed in said carrier with its open end facing and closed by the bearing surface of said frame member, means for supplying said pressure chamber with a fluid medium under pressure so that a portion of the weight of the tool carrier is borne by the fluid medium whereby to effect a decrease in the static frictional load on the bearing surfaces, an O-ring type of seal about the margins of said pressure chamber, and means for adjusting the carrier along the bearing surfaces of said frame member while the latter are so relieved of a portion of the static frictional load thereon.

8. The combination of claim 7 in which a plurality of pressure chambers are provided in the carrier, said chambers being spaced from one another and located in the carrier at the zones of greatest load concentration.

9. In a mechanical organization, a supporting frame member having horizontally disposed relatively flat bearing surfaces, a relatively massive carrier movable along said bearing surfaces, the weight of said carrier normally developing a relatively high coefficient of static friction between said bearing surfaces inducing a stick-slip condition that renders the carrier difficult to adjust to a preselected precision-located point along said bearing surfaces, means operative to relieve said bearing surfaces of a portion of the static frictional load of the carrier during the period of movement thereof comprising an open-ended pressure chamber formed in said carrier with its open end facing and closed by the bearing surface of said frame member, sealing means about the margins of said pressure chamber, means for supplying said chamber with a fluid medium under pressure so that a portion of the weight of the carrier is borne by the fluid medium whereby to effect a decrease in the static frictional load on the bearing surfaces, means for adjusting the carrier along the bearing surfaces of said frame member while the latter are so relieved of a portion of the static frictional load thereon, and lubricating means independent of said pressure chamber and the said means for supplying fluid medium under pressure for lubricating the engaging bearing surfaces of said frame member and carrier.

10. The combination of claim 9 in which the fluid medium is oil and in which the said means for supplying the chamber with the fluid medium includes a pump unit and a system of conduits embodying flow-controlling means.

*11. In a machine tool, a frame member having a relatively flat load-supporting bearing surface along its upper portion, a supporting member movable relative to said frame member, said supporting member having a relatively flat bearing surface complementary to and in bearing relation with the bearing surface of said frame member, one of said members having at least one relatively shallow recess formed in its bearing surface in open communication with the bearing surface of the other said member, said recess being relatively large in surface area and its open end closed by the flat bearing surface of the other said member so as to form a chamber, means including a conduit in the member having at least one recess therein and connected with the interior of each said chamber for supplying each said chamber with a fluid medium maintained at a substantially constant pressure so that a predetermined substantial portion of the weight of said structure is borne continuously by the fluid medium and the remainder by said bearing surfaces, means for moving the supporting member relative to said load-supporting bearing surface while a predetermined substantial portion of the weight is borne by the fluid medium maintained at a substantially constant pressure in each said chamber, and separate means for supplying lubricant to the bearing surface surrounding each load-counteracting pressure chamber.*

*12. In a machine tool, a supporting frame member having horizontally disposed relatively-flat bearing surfaces on its upper side, a relatively massive carrier member having complementary bearing surfaces along its under side and movable relative to said frame member upon said bearing surfaces, the weight of said carrier member normally developing a relatively high coefficient of static friction between the respective bearing surfaces*

*thereby inducing a stick-slip condition when the carrier member is to be adjusted to a preselected precision located point upon said bearing surfaces, means for lubricating said bearing surfaces and additional means operative to relieve said bearing surfaces of a portion of the static frictional load of the carrier member during the period of movement thereof comprising at least one open-ended pressure chamber formed in one of said members with its open end facing and closed by the bearing surface of the other of said members, means for supplying each said pressure chamber with a fluid medium under pressure so that a portion of the weight of the carrier member is borne by the fluid medium whereby to effect a decrease in the static frictional load on the bearing surfaces, an O-ring type of seal about the margin of each*

*said pressure chamber, and means for adjusting the carrier member along the bearing surfaces of said frame member while the latter are so relieved of a portion of the static frictional load thereon.*

References Cited in the file of this patent or the original patent

UNITED STATES PATENTS

| | | |
|---|---|---|
| 519,906 | Harrison | May 15, 1894 |
| 1,759,412 | Noble | May 20, 1930 |
| 2,183,363 | Zimmerman | Dec. 12, 1939 |
| 2,520,879 | Dall | Aug. 29, 1950 |
| 2,521,030 | Wilson | Sept. 5, 1950 |
| 2,617,695 | Tauscher | Nov. 11, 1952 |